United States Patent [19]
Onnen

[11] 3,989,465
[45] Nov. 2, 1976

[54] APPARATUS FOR CONTROLLING REACTION CONDITIONS IN A SULFUR DIOXIDE SCRUBBER

[75] Inventor: James H. Onnen, Louisville, Ky.

[73] Assignee: American Air Filter Company, Inc., Louisville, Ky.

[22] Filed: Apr. 7, 1975

[21] Appl. No.: 565,419

Related U.S. Application Data

[62] Division of Ser. No. 338,762, March 7, 1973, Pat. No. 3,897,540.

[52] U.S. Cl. ............................. 23/260; 23/253 A; 23/284; 23/285; 55/257 C
[51] Int. Cl.² .................. B01J 10/00; C01B 17/58; G01N 27/26
[58] Field of Search ......... 23/284, 285, 260, 253 A, 23/230 A, 283; 55/233, 257 C

[56] References Cited
UNITED STATES PATENTS

| | | | |
|---|---|---|---|
| 2,142,406 | 1/1939 | Nonhebel et al. | 23/260 |
| 3,216,925 | 11/1965 | Fanning et al. | 23/253 A X |
| 3,578,431 | 5/1971 | Ingestad et al. | 23/253 A X |
| 3,773,472 | 11/1973 | Hausberg et al. | 23/283 |
| 3,791,793 | 2/1974 | Friedmann et al. | 23/253 A X |
| 3,826,816 | 7/1974 | McCormick | 23/260 X |
| 3,880,597 | 4/1975 | Goldschmidt | 23/283 |

Primary Examiner—Morris O. Wolk
Assistant Examiner—Michael S. Marcus

[57] ABSTRACT

A process and apparatus for treating industrial stack gases containing sulfur dioxide in the gas contact zone of a scrubbing tower with an aqueous medium containing a sulfur dioxide reactant material, which aqueous medium is subsequently removed from the contact zone and introduced into a reaction tank where the initial reaction product is oxidized to more stable reaction products. The process includes automatically controlling the pH of the liquid in the reaction tank, which automatic controlling includes monitoring the conditions in the reaction tank, comparing the information from the monitor to an optimum preselected condition and introducing a corrective portion of basic liquid into said reaction tank to attain the optimum preselected condition. The process further includes using the reaction tank as a supply reservoir for liquid introduced into the contact zone of the scrubbing tower, thus, insuring that the liquid introduced into the contact zone is of optimum pH for reaction.

4 Claims, 1 Drawing Figure

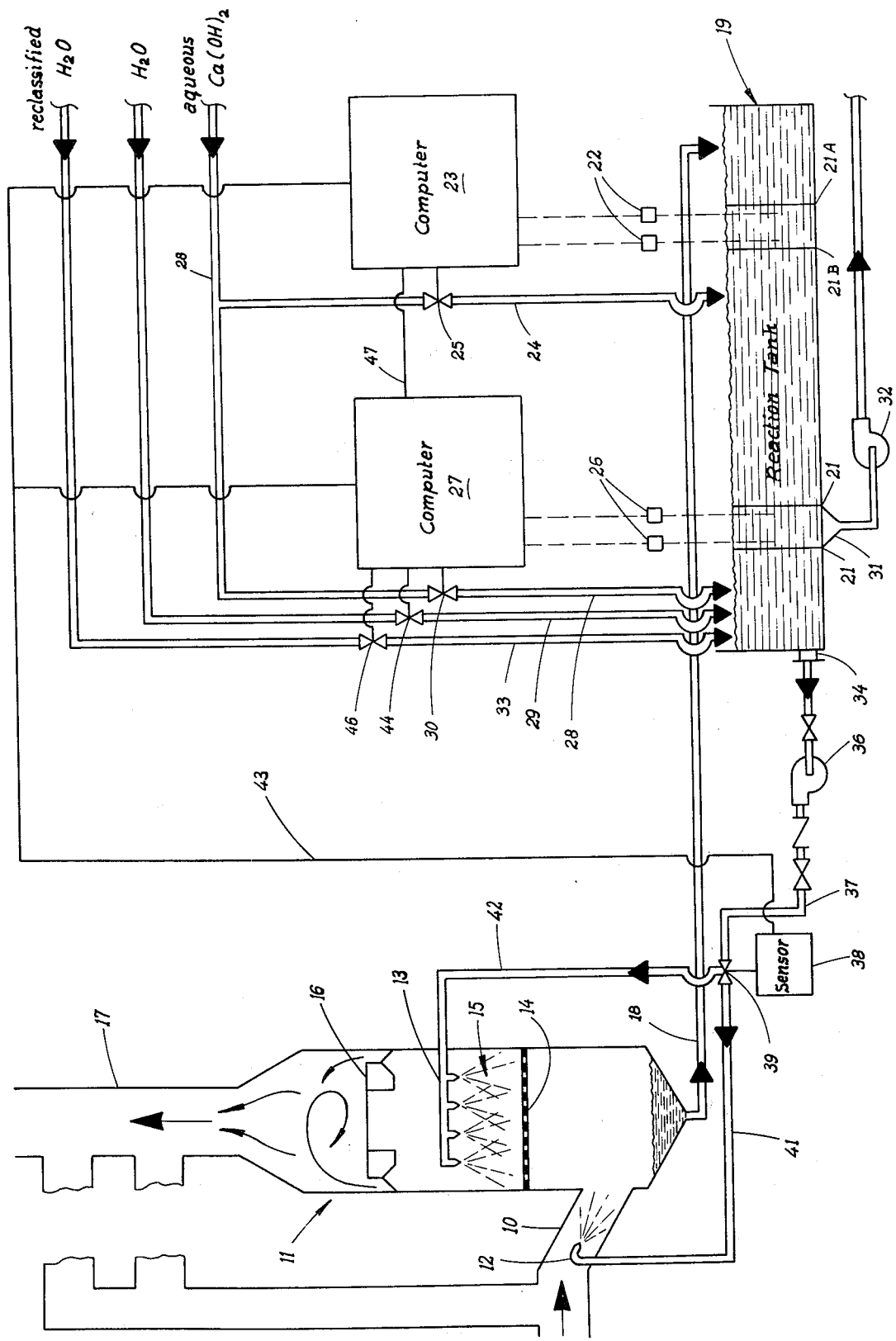

APPARATUS FOR CONTROLLING REACTION CONDITIONS IN A SULFUR DIOXIDE SCRUBBER

CROSS REFERENCE TO RELATED APPLICATION

The present invention is a division of copending application Ser. No. 338,762, filed March 7, 1973 by James H. Onnen, now U.S. Pat. No. 3,897,540.

BACKGROUND OF THE INVENTION

With growing concern about the quantity of sulfur oxides, particularly sulfur dioxide, being introduced into the atmosphere from industrial stack gases, emphasis has focused upon developing an air pollution control system that is capable of achieving a high degree of sulfur dioxide removal from such industrial stack gases. This objective may generally be accomplished by providing a scrubber system wherein an excess of sulfur dioxide reactant material is provided for reaction. However, this approach has two serious disadvantages which offset the advantage of sulfur dioxide removal. The first disadvantage is the additional costs of the excess supply of sulfur dioxide reactant material. The second is the large quantities of solid waste material discharged from such a system. Such waste material must be disposed of in a manner consistent with current antipollution codes. Further, in such a system the pH of liquids therein, particularly within the scrubbing or contact zone of the scrubber, may be effectively changed by changes in the sulfur content of the fuel, or by changes in the ratio of additive to fuel, or even by changes in the reactivity of the sulfur dioxide reactant material. It is generally found that when the pH in the contact zone is too low the scrubber itself is subject to acid attack. Alternatively, when the pH is too high precipitation occurs in the contact zone and causes scaling which reduces the efficiency of the overall system. Further, it has been observed that to obtain optimum scrubbing of an industrial stack gas in a scrubber, the gas flow velocity therethrough should be maintained within the range of several hundred feed per minute. To meet this requirement air pollution control systems have been designed which have multiple scrubbers operated in parallel and which are selectively removed or inserted into the stream as the gas load varies. In this manner, the industrial stack gas flow rate through a given scrubber is maintained in the proper range. The use of a plurality of scrubbers operated in parallel however, serves to compound the problem of optimizing and controlling the sulfur dioxide reactant material concentrations and the pH within the various scrubbers. In addition, because the industrial stack gas paths from the source to the several scrubbers in parallel may vary considerably from one to another in length and geometry, the demands for sulfur dioxide reactant material in each of the scrubbers may differ significantly from one to another, thereby resulting in different sulfur dioxide removal conditions at each scrubber. Such variations may result in comparable variations in the pH's within the contact zone of the scrubbers. The present invention overcomes the above described prior art problems and provides a straightforward, inexpensive, readily employed and easily operated system for removal of sulfur dioxide from industrial stack gases eliminating much of the equipment previously required using a minimum of space and, at the same time, providing effective control.

SUMMARY OF THE INVENTION

The present invention provides a method of removing sulfur dioxide from industrial stack gases and more particularly provides a method of removal of sulfur dioxide from such gases according to a process which provides for forming an initial reaction product between sulfur dioxide and a preselected sulfur dioxide reactant material in the contact zone of a scrubbing tower. This initial reaction product is transformed into a more stable reaction product in a reaction tank remote from the contact zone of the scrubbing tower. The method further provides for automatic sampling of the reaction conditions at, at least one point in the reaction tank, followed by subsequent automatic adjustment of such conditions to optimize the reaction in the tank. The process further includes continuous withdrawal of liquid from the reaction tank with a first portion of such liquid being regenerated and returned to the tank and a second portion being recycled to the contact zone. More specifically, the present invention provides a continuous process for treating industrial stack gases containing sulfur dioxide comprising: contacting the industrial stack gases in the contact zone of a gas scrubbing tower with an aqueous medium containing sulfur dioxide reactant material whereupon an initial reaction product is formed; passing the aqueous medium, containing principally the initial reaction product, from the gas scrubbing tower into the upstream end of a filled continuously flowing reaction tank wherein the initial reaction product is further reacted to form a second more stable reaction product as the aqueous medium flows through the tank; monitoring the reaction conditions at a first location in the reaction tank and automatically adjusting the pH of the reaction conditions based upon a comparison of the information from the monitor to a fixed standard; monitoring the reaction conditions at a second location downstream of the first in the reaction tank and automatically adjusting the pH of the reaction conditions based upon a comparison of the information from the monitor to a second fixed standard; continuously removing a first portion of the aqueous medium containing said second reaction product from the reaction tank, removing said second reaction product for disposal and reintroducing said aqueous medium into said reaction tank; and continuously recirculating a second portion of the aqueous medium from the reaction tank to the contact zone of the scrubbing tower. The present invention has been found to be an inexpensive and efficient method for removing sulfur dioxide from industrial stack gases particularly when a plurality of scrubbing towers are employed in parallel to treat an effluent waste stack gas stream.

DESCRIPTION OF THE DRAWING

The FIGURE is a schematic diagram showing the various features of the invention.

DESCRIPTION OF THE PREFERRED EMBODIMENT

Hot industrial stack gases enter gas inlet 10 of scrubbing tower 11 where they are initially contacted with a liquid containing a sulfur dioxide reactant material from nozzle means 12. The gas stream then passes through the bottom portion of the scrubbing tower and upwardly through baffle 14, through contact zone 15, past nozzle means 13, through water eliminator 16 and out stack 17. The sulfur dioxide contained in the industrial stack gases reacts in contact zone 15 with a sulfur dioxide reactant material, which is contained in the liquid being discharged from nozzle means 12 and 13, to form an initial reacion product. This initial reaction product is entrained in the liquid and is collected at the bottom of the cooling tower and carried by line 18 to the upstream end of a filled continuously flowing reaction tank 19. The liquid containing the initial reaction product is deposited into reaction tank 19 and the initial reaction product is driven, by further reaction, to a more stable second reaction product.

In reaction tank 19 baffle means 21 are provided to promote more complete mixing of the liquid therein. Baffle means 21 are located in such a manner as to partition off a section of reaction tank 19. This partitioning necessitates that liquid entering the upstream end of the reaction tank flow over the first baffle 21A to get into the partitioned area. This creates a more homogeneous liquid sample within the partitioned area. First sensor means 22 is located in this partitioned area near the upstream end of the reaction tank. Sensor means 22 monitors the reaction conditions at the upstream end of the tank. A computer 23 receives the monitored information from sensor means 22 and in turn compares it to a fixed standard. If the comparison indicates a need for pH adjustment to a value between 2 and 10 on the pH scale, to optimize the reaction conditions, the computer directs the opening of valve 25 in line 24 and a flow of fresh liquid containing a sulfur dioxide reactive cation and hydroxyl ions, for example, aqueous calcium hydroxide, enters the reaction tank. It should be noted at this point that the sulfur dioxide reactant material and the hydroxyl ions of the fresh liquid in line 28 are combined in the proper stoichrometric ratios so that there is no accumulation of cations with concomitant starvation of hydroxyl ions in the reaction tank.

A second sensor means 26 is employed similarly downstream of the first sensor 22 and likewise its monitoring signal is fed to a computer 27 which in turn adjusts the pH to a value between 2 and 10 on the pH scale at the downstream end of the tank by directing the opening of valve 30 in line 28. Meanwhile as the liquid flows over the second baffle 21B at the upstream end of the tank and along the length of the reaction tank, the initial reaction product is further reacted to a more stable second reaction product. Due to rapid and precise pH control the reaction conditions are maintained at an optimum level in the reaction tank, and ultimately the sulfur dioxide reactant material is used in a highly efficient manner. Thus, the removal process becomes very economical and realizes the advantage of producing a minimum of waste reaction product. The reaction product is substantially solid and precipitates to the bottom of the reaction tank where it is removed through drain 31 and through pump 32 to be separated by filtering or centrifuging or other means, with the liquid carrier containing unused sulfur dioxide reactant material being returned as reclassified water through line 33 (connections not shown in detail). A second portion of liquid is removed through outlet 34, pump 36, line 37 and through valve 39 of sensor 38 located at the juncture of lines 41 and 42. Sensor 38 proportions the return flow of liquid through lines 41 and 42 to nozzle means 12 and 13 respectively. It should be noted that nozzles 12 and 13 are positioned in scrubber 11 to optimize liquid gas contact. Nozzle 12 is located in the stack gas inlet and positioned to direct the liquid, advantageously an aqueous medium, in co-current flow with the incoming stack gases. Nozzle 13 on the other hand, is located above scrubber contact zone 15 and directs the liquid in countercurrent flow with respect to the stack gases. The signal from sensor 38 is transmitted through line 43 to computers 23 and 27 where it is compared to similar signals obtained from monitoring the flow through valves 25, 30, 44 and 46 as well as information regarding the liquid level in reaction tank 19, which is obtained from sensor means 22 and 26. This information is used by the computers to control the liquid level in the reaction tank principally by controlling the flow of fresh water entering the system through line 29. In this regard, it should be noted that computer 23 is interconnected with computer 27 to allow the exchange of information therebetween and allow the liquid level in the tank to be controlled. It is of course possible that a single computer could be used to replace computers 23 and 27. Also it is possible to have nozzle 12 in flow communication with a fresh water supply and recycle liquid from the reaction tank only through line 42 and nozzle means 13.

It should be noted that the actual conditions in the scrubbing zone of the tower are not monitored. This is because the conditions in the scrubbing zone are unsteady state conditions and consequently the information received from any monitor therein is found to be so erratic and changeable that it may not be truly representative of the overall reaction conditions in the contact zone. It has been found that by sensing the reaction conditions in the reaction tank 19 the composition of the liquid emitted from nozzle means 12 and 13 can be more properly controlled as needed. In this regard, it should be further noted that sensing means 22 is located near the upstream end of reaction tank 19 and senses a representative homogeneous sample of the liquid shortly after it leaves the scrubber tower. This information is fed into computer 23 where it is compared to a fixed standard which represents the optimum desirable composition of the liquid at this point and then this information is fed to computer 27 whereupon it is compared to the information from sensor 26 which gives the composition of the liquid prior to it being introduced through nozzle means 12 and 13 into the scrubber tower. Computer 27 may then adjust the various liquid flows through lines 28, 29 and 33 to give the necessary precise composition of the liquid fed to the scrubber based upon the composition computer 23 determines is needed.

Advantageously, the liquid used in the scrubber system is water and the sulfur dioxide reactant material is selected from any one of a number of reaction materials such as salts or naturally occurring materials which are soluable or partially soluable in water. Such materials include but are not limited to, alkaline metal compounds, such as calcium hydroxide, calcium carbonate, calcium bicarbonate, sodium carbonate, sodium bicarbonate, and several naturally occurring materials such as torona and nahcolite, and combinations of any of the foregoing. Most advantageously calcium hydroxide $Ca(OH)_2$ is selected as the sulfur dioxide reactant material since the cation is reactive with sulfur dioxide and the anion serves to simultaneously adjust the pH of the reaction conditions. This situation should be contrasted with the situation where a non-hydroxyl salt is selected and a strong base such as sodium hydroxide, for example, is added thereto to formulate a pH adjusting solution which contains a sulfur dioxide reactant material. Also it may be desirable to include small amounts of vanadium compounds to accelerate the reaction between the alkaline metal compounds and the sulfur dioxide.

Having thus described the invention, what is claimed is:

1. A system for removing sulfur dioxide from an industrial stack gas stream resulting from the combination of fossil fuels comprising: wet scrubbing means for contacting and reacting an industrial stack gas stream in a scrubbing zone thereof with a first aqueous medium having a sulfur dioxide reactant material thereby forming an initial reaction product, said wet scrubbing means including a stack gas inlet, a stack gas outlet, inlet means for introducing said first aqueous medium to said scrubber, and, an initial reaction product discharge outlet;

means for regulating the rate at which said first aqueous medium is circulated to said contact zone through said first aqueous inlet means;

means for transferring said initial reaction product from said wet scrubbing means to a reaction tank;

said reaction tank including means for introducing a second aqueous medium having a sulfur dioxide reactant material therein whereby said initial reaction product is further reacted to form a second more stable reaction product by further reaction resulting in dissolved and precipitated sulfates and sulfites being removed therefrom;

first means for sensing the pH of said reaction conditions inside said reaction tank at a first location therein;

means for comparing said sensed pH with a desired pH;

first means for regulating the addition of a first portion of said second aqueous medium in response to said comparing means, said first portion of said second aqueous medium being introduced downstream of said first pH sensing means;

second means for sensing said pH of said reaction conditions inside said reaction tank downstream of said first means and said means for introducing said first portion of said second aqueous medium; and, second means for regulating the addition of a second portion of said second aqueous medium in response to said comparing means to maintain the liquid level in said reaction tank and adjust the composition of a resulting aqueous medium to a desired pH level, said second portion of said second aqueous medium being introduced downstream of said second pH sensing means;

means for recirculating a portion of said resulting aqueous solution from said reaction tank to said wet scrubbing means, said recirculating means being connected to said tank downstream of the point of introducing said second portion of said second aqueous medium; and, means for removal of said solid precipitates from said reaction tank.

2. The system of claim 1 wherein said first means and second means for sensing the pH of the reaction conditions inside said reaction tank are located each within a separate partitioned area of the tank including baffles therein, the liquid flowing over said baffles to enter said partitioned areas thereby becoming homogenous and representative of actual conditions prevalent upstream thereof.

3. The apparatus of claim 1 wherein said means for recirculating a portion of said resulting aqueous solution from said reaction tank is connected to and communicates with said first aqueous medium inlet means, said first aqueous medium inlet means comprises two nozzles one located in said stack gas inlet and positioned to direct said first aqueous medium in co-current flow with the incoming stack gases and said other nozzle being located above the scrubber contact zone directing said first aqueous medium in countercurrent flow with respect to said stack gases whereby said first aqueous medium includes said resulting aqueous solution.

4. The system of claim 1 wherein said scrubbing means are plural in number each having its own independent means for sensing the pH and adjusting the reaction conditions therein.

* * * * *